United States Patent
Denault et al.

(10) Patent No.: US 9,927,076 B2
(45) Date of Patent: Mar. 27, 2018

(54) LASER-DRIVEN WHITE LIGHTING SYSTEM FOR HIGH-BRIGHTNESS APPLICATIONS

(71) Applicant: The Regents of the University of California, Oakland, CA (US)

(72) Inventors: Kristin A. Denault, Santa Barbara, CA (US); Steven P. DenBaars, Goleta, CA (US); Ram Seshadri Seshadri, Goleta, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 15/412,289

(22) Filed: Jan. 23, 2017

(65) Prior Publication Data

US 2017/0130910 A1   May 11, 2017

Related U.S. Application Data

(62) Division of application No. 14/448,426, filed on Jul. 31, 2014, now Pat. No. 9,574,728.

(Continued)

(51) Int. Cl.

| | |
|---|---|
| *F21K 9/64* | (2016.01) |
| *F21V 29/70* | (2015.01) |
| *F21V 8/00* | (2006.01) |
| *F21K 9/61* | (2016.01) |
| *F21V 7/00* | (2006.01) |
| *F21V 21/10* | (2006.01) |
| *F21V 9/16* | (2006.01) |
| *F21V 3/00* | (2015.01) |
| *F21W 131/105* | (2006.01) |
| *F21Y 115/30* | (2016.01) |

(52) U.S. Cl.
CPC .......... *F21K 9/64* (2016.08); *F21K 9/61* (2016.08); *F21V 3/00* (2013.01); *F21V 7/00* (2013.01); *F21V 9/16* (2013.01); *F21V 21/10* (2013.01); *F21V 29/70* (2015.01); *G02B 6/0005* (2013.01); *F21W 2131/105* (2013.01); *F21Y 2115/30* (2016.08)

(58) Field of Classification Search
None
See application file for complete search history.

(56) References Cited

U.S. PATENT DOCUMENTS

| | | | |
|---|---|---|---|
| 7,868,341 | B2 | 1/2011 | Diana et al. |
| 7,902,560 | B2 | 3/2011 | Bierhuizen et al. |

(Continued)

FOREIGN PATENT DOCUMENTS

| | | | |
|---|---|---|---|
| JP | 2013-030720 | * | 2/2013 |
| WO | 2014/036409 | | 3/2014 |

*Primary Examiner* — Ashok Patel
(74) *Attorney, Agent, or Firm* — Gates & Cooper LLP

(57) ABSTRACT

A high-power, high-brightness lighting system for large venue lighting, which includes a laser diode as the excitation source and one or more phosphor materials placed at a remote distance from the laser source. The invention offers a lighting system with the advantages of high brightness, high efficiency, high luminous efficacy, long lifetimes, quick turn-on times, suitable color properties, environmental sustainability, and easy maintenance, which may allow for smart and flexible control over large area lighting systems with resulting savings in operating and maintenance costs.

10 Claims, 5 Drawing Sheets

Related U.S. Application Data

(60) Provisional application No. 61/860,619, filed on Jul. 31, 2013.

(56) References Cited

U.S. PATENT DOCUMENTS

| | | |
|---|---|---|
| 2006/0049416 A1 | 3/2006 | Baretz et al. |
| 2008/0116473 A1 | 5/2008 | Sugiyama |
| 2009/0212314 A1 | 8/2009 | Im et al. |
| 2011/0044046 A1* | 2/2011 | Abu-Ageel ............... F21K 9/00 362/259 |
| 2011/0175520 A1 | 7/2011 | Ramer et al. |
| 2012/0033404 A1 | 2/2012 | Wu et al. |
| 2012/0057364 A1* | 3/2012 | Kishimoto ............. F21S 48/115 362/538 |
| 2012/0106184 A1 | 5/2012 | Kishimoto et al. |
| 2013/0279151 A1* | 10/2013 | Ouderkirk ............ H01L 33/507 362/84 |
| 2013/0335989 A1* | 12/2013 | Sato ........................ F21V 9/16 362/510 |
| 2014/0003074 A1* | 1/2014 | Kishimoto ......... C09K 11/0883 362/510 |
| 2014/0168942 A1* | 6/2014 | Kishimoto ............ F21S 48/214 362/84 |

* cited by examiner

LASER-DRIVEN WHITE LIGHTING SYSTEM FOR HIGH-BRIGHTNESS APPLICATIONS

CROSS-REFERENCE TO RELATED APPLICATIONS

This application is a divisional under 35 U.S.C. Section 121 of co-pending and commonly-assigned:

U.S. Utility patent application Ser. No. 14/448,426, filed on Jul. 31, 2014, by Kristin A. Denault, Steven P. DenBaars and Ram Seshadri, entitled "LASER-DRIVEN WHITE LIGHTING SYSTEM FOR HIGH-BRIGHTNESS APPLICATIONS,"

which application claims the benefit under 35 U.S.C. Section 119(e) of commonly-assigned:

U.S. Provisional Patent Application Ser. No. 61/860,619, filed on Jul. 31, 2013, by Kristin A. Denault, Steven P. DenBaars and Ram Seshadri, entitled "LASER-DRIVEN WHITE LIGHTING SYSTEM FOR HIGH-BRIGHTNESS APPLICATIONS,"

both of which applications are incorporated by reference herein.

This application is related to the following co-pending and commonly-assigned patent applications:

P.C.T. International Patent Application Serial No. PCT/US2013/057538, filed on Aug. 30, 2013, by Ram Seshadri, Steven P. DenBaars, Kristin A. Denault, and Michael Cantore, entitled "HIGH-POWER, LASER-DRIVEN, WHITE LIGHT SOURCE USING ONE OR MORE PHOSPHORS," which application claims the benefit under 35 U.S.C Section 119(e) of U.S. Provisional Patent Application Ser. No. 61/695,120, filed on Aug. 30, 2012, by Ram Seshadri, Steven P. DenBaars, Kristin A. Denault, and Michael Cantore, entitled "HIGH-POWER, LASER-DRIVEN, WHITE LIGHT SOURCE USING ONE OR MORE PHOSPHORS,"

which applications are incorporated by reference herein.

BACKGROUND OF THE INVENTION

1. Field of the Invention

The present invention relates generally to the field of solid-state white lighting devices and specifically to the field of high-brightness lighting, in which there is a need to illuminate a large area. In particular, the invention embodies the generation of white light using a laser diode (LD) as the excitation source in combination with phosphor materials for high-brightness applications.

2. Description of the Related Art

Large area venues such as sports arenas, auditoriums, and parking lots require a lighting system with high brightness, high luminous efficacy, and quality white light in terms of color rendition and color temperature. The lighting system should additionally have the qualities of energy efficiency, simple and flexible operation and control, easy and low-cost maintenance, and environmental sustainability.

Most current high-brightness lighting systems use high intensity discharge (HID) lamps, which are usually metal halide or high pressure sodium vapor lamps. These HID lamps are widely used for this application due to their high luminous efficacy compared to fluorescent or incandescent lamps and longer operating lifetimes. A typical metal halide lamp has a luminous efficacy of 65 lm/W to 115 lm/W with a lifetime of 10,000 hours to 20,000 hours. The quality of the white light produced is also suitable for large venue applications with a color rendering index (CRI) of 65 to 90 and a correlated color temperature (CCT) of 3000 K to 20,000 K.

The HID light fixtures are typically mounted at a distance above the venue and the output light is directed to illuminate the area below.

The use of HID lamps for high-brightness lighting applications currently poses a number of disadvantages. For one, the warm up time for the lamps to reach full brightness can take anywhere from 1 minute to 15 minutes. Additionally, if the lights are turned off, it can take up to 10 minutes before they can be turned on again. This cycling of restarting the lighting before they have sufficiently cooled is also a source of wear and leads to quicker degradation and shorter lifetimes. For this reason, large venue lighting is rarely turned off if the lights need only to be off for a short amount of time. In this case, shutters are used to block the light, instead of turning the lights off. This is not an energy efficient means of operation since electricity is still being used by the lights. The same situation occurs if only a section of lights is to remain on during an event. This operation technique therefore also introduces a shutter into the lighting system, which must also be maintained and may require a motor for operation. The final disadvantage of HID lamps for large venue lighting concerns the maintenance. Replacement of lights requires manual replacement, and since the lamps are usually mounted at a height above the venue, this can be a dangerous task.

With the advent of light emitting diode (LED) technologies, such as laser diodes, new large venue lighting systems are being designed. These include the use of LEDs combined with a phosphor material to produce white light. LED-based lamps offer similar benefits as HID lamps in terms of luminous efficacies, color rendition, and color temperature. LED-based lamps also have the advantage of longer lifetimes up to 50,000 hours, relatively instant turn-on times achieving full brightness in less than a microsecond, the ability to be turned off and on quickly, and environmental sustainability. An important advantage is therefore that different sections of lights can be flexibly turned on and off at will, eliminating the need for shutters and saving energy. The maintenance problems still exist with LED-based stadium lighting as with HID lamps, such that replacement requires individual bulbs to be changed manually.

There is therefore a need for large venue lighting that includes all of the benefits of prior systems including high-brightness, high efficiency, high luminous efficacy, long lifetimes, quick turn-on times, suitable color properties, and environmental sustainability with the added advantage of easy maintenance. Such a system would allow for smart and flexible control over the lighting, ease of maintenance, and savings in operating and maintenance costs. The present invention satisfies this need.

SUMMARY OF THE INVENTION

To overcome the limitations in the prior art described above, and to overcome other limitations that will become apparent upon reading and understanding the present specification, the present invention discloses a high-power, high-brightness lighting system for large venue lighting, comprising a laser diode as the excitation source and one or more phosphor materials placed at a remote distance from the laser diode source.

The preferred embodiment of the invention comprises an UV or blue light emitting laser diode as the excitation source, one or more down-converting phosphor materials with an emission color in the visible region of the electromagnetic spectrum ranging from blue to red, a structure for housing the phosphor materials, and a waveguiding material.

The laser diode may be placed at ground level of a large venue to allow for easy maintenance and changing of the laser diode. Waveguiding materials, for example, optical fibers, may then be used to carry the laser light to the phosphor materials. The laser diode may instead be placed at a distance relatively closer to the point of illumination, but still easily accessible to allow for maintenance, and directed onto the phosphor material without transmission through a waveguiding material.

The laser diode emission beam may be split into several beams directed towards phosphor materials in different areas of the large venue. The laser beam may or may not be diffused before striking the phosphor materials.

The structure for housing the phosphor material may be placed at the point of illumination. The structure for housing the phosphor material may consist of the phosphor material deposited onto a substrate material, such as polished aluminum or a silver coating. The substrate may act as a reflector material. The substrate may act as a heat sink. The structure for housing the phosphor material may completely enclose the phosphor material with an optically transparent window to direct the emitted white light towards the area to be illuminated. The near-UV or blue laser diode light may or may not be filtered out from the resulting white light through the use of long-pass filters, resulting in eye safe devices.

A lighting system which comprises laser diode excitation of a phosphor material offers many advantages to both HID and LED-based lighting systems. LED-based lighting systems, which typically use an UV-emitting or blue-emitting LED combined with one or more phosphor materials, already offer benefits over HID lighting systems including long lifetimes, relatively instant turn-on times, the ability to be turned off and on quickly, environmentally friendly designs, and enormous energy savings. Yet, the overall efficiency of these devices can still be improved.

One such example is to control the operating temperature of the device. When operating an LED, the temperature will inevitably increase, yet the phosphor particles exhibit a loss in efficiency as the temperature of the device increases. This temperature increase will also occur when using a laser diode as the excitation source, but using a thermally conductive substrate can minimize the loss in efficiency of the phosphor materials.

In addition, LEDs suffer from efficiency loss and color instability with increased operating current, making high-power, high-brightness devices not achievable using current LEDs as the excitation source. In contrast to LEDs, laser diodes do not exhibit this efficiency loss with increased operating current, many exhibit increased efficiency as current increases, and maintain color stability. Using a laser diode allows for the realization of a high-power solid state white lighting device with stable color properties and no loss in efficiency at high operating currents.

Laser-based devices also offer easy servicing of parts. The use of lasers with a remote phosphor configuration allows the laser to be placed at a relatively far distance from the phosphor, as would be useful in the case of large venue lighting. Lasers on the ground level, which excite phosphors placed at the point that is to be illuminated, can then easily be serviced when necessary, in contrast to LED-based lighting, where the entire LED device must be placed at the point of illumination.

Overall, the invention described here may provide a stable lighting system with the advantages of high brightness, high efficiency, high luminous efficacy, long lifetimes, quick turn-on times, suitable color properties, and environmental sustainability with the added advantage of easy maintenance. Such a system may allow for smart and flexible control over the lighting system, ease of maintenance, and savings in operating and maintenance costs.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

Figure 1A:
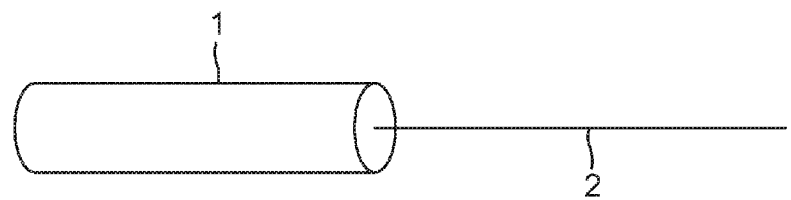
FIGS. 1(a), 1(b) and 1(c) are schematics representing the laser diode.
Figure 1B:
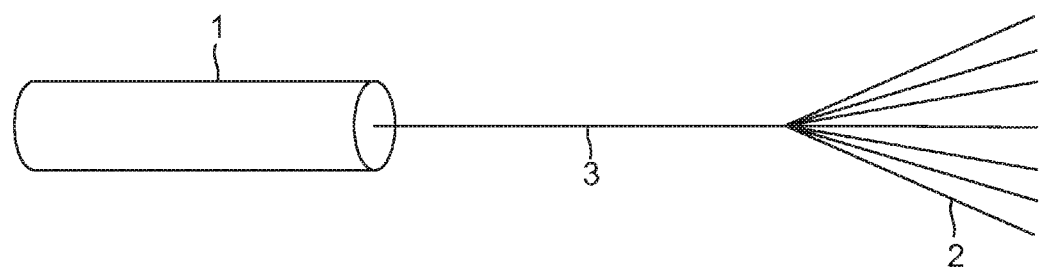
Figure 1C:
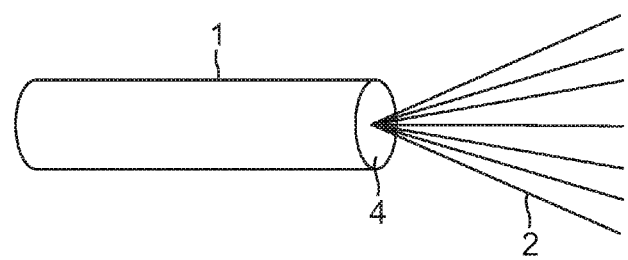

FIGS. 1(a), 1(b) and 1(c) are schematic diagrams representing the laser diode excitation source. The laser diode housed in casing 1 may emit light 2 in the wavelength range from UV to blue. The laser diode emission 2 will exit the laser diode casing 1. After the light 2 exits the casing 1, the light 2 may be transported to the phosphor material directly through the atmosphere, as illustrated by FIG. 1(a), or by a waveguiding material 3, as illustrated in FIG. 1(b). The laser beam 2 may also be transported to the phosphor material in the form of a single beam of light 2, as shown in FIG. 1(a), or first passing through a diffuser 4 to split the single laser beam into multiple beams of light 2, as shown in FIG. 1(c). Several laser diodes may be used as multiple excitation sources in order to allow for flexible control the lighting system, including the option to turn off certain sections while leaving other sections illuminated. The laser diode casings 1 may also be able to pivot mechanically in order to change the direction of the emitted light 2 to illuminate different section.

Figure 2A:
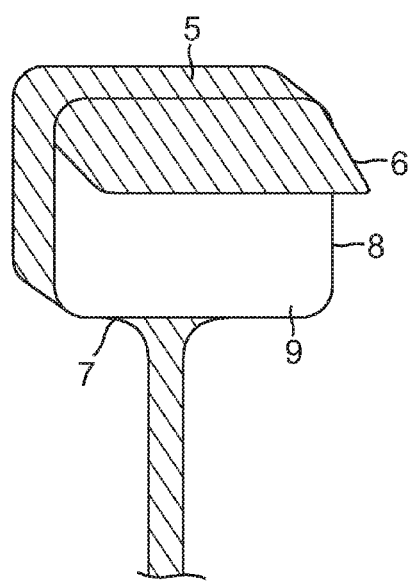
FIGS. 2(a), 2(b), 2(c) and 2(d) are schematics representing the outer structure for housing the phosphor material.
Figure 2B:
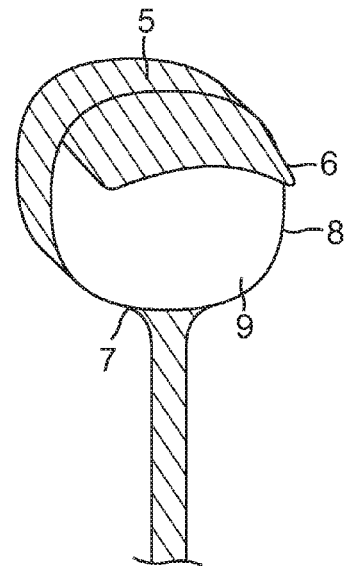
Figure 2C:
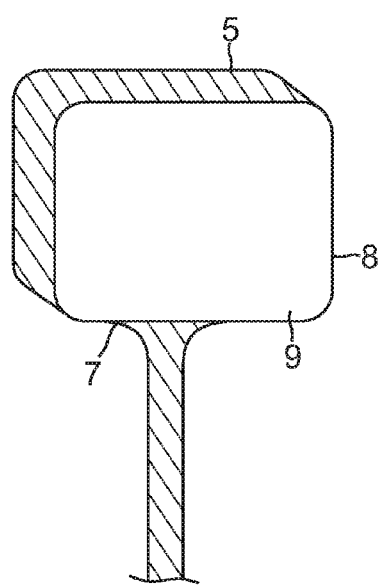
Figure 2D:
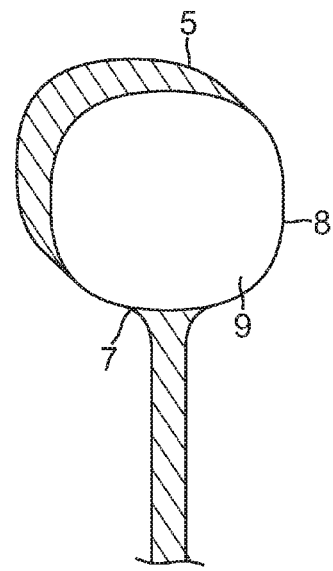

FIGS. 2(a), 2(b), 2(c) and 2(d) are schematic diagrams representing the outer structure 5 for housing the phosphor material to be excited. The structure 5 may be constructed in any number of different shapes, for example, a square or rectangle, as illustrated in FIG. 2(a) and FIG. 2(c), or a circle or oval, as illustrated in FIG. 2(b) and FIG. 2(d). The structure 5 may have an outer covering 6 to direct the emitted white light in a specific direction, as illustrated in FIG. 2(a) and FIG. 2(b), or may not, as illustrated in FIG. 2(c) and FIG. 2(d). The structure 5 may or may not have a hinge 7 connecting the structure 5 to a post, which may move mechanically to adjust the angle. The structure 5 may completely enclose the phosphor material to protect it from environmental conditions and may have an optically transparent window 8 from which the emitted white light exits the structure 5. Inside the structure 5 may be a substrate 9 upon which the phosphor material is deposited.

Figure 3A:
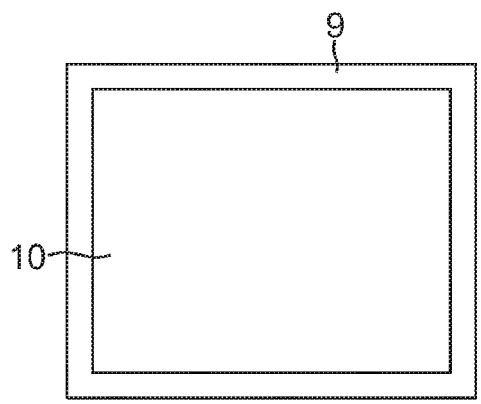
FIGS. 3(a), 3(b) and 3(c) are schematics representing the substrate inside of the structure for housing the phosphor material.
Figure 3B:
Figure 3C:
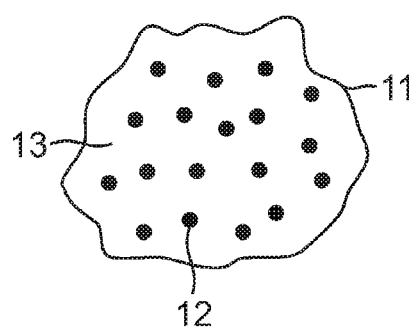

FIG. 3(a) is a schematic diagram representing the substrate 9 upon which the phosphor material is deposited. The substrate 9 may be made of a thermally conductive material to transport heat generated away from the phosphor material to maintain high operating efficiencies. The surface 10 of the substrate 9 may be reflective in nature, comprised of, for example, polished aluminum or a layer of silver, to reflect the emitted white light down onto the area to be lighted. As illustrated in FIG. 3(b) and FIG. 3(c), the surface 10 of the substrate 9 may have a deposited layer 11, which contains a mixture of the phosphor material 12, which may be in powder form, encapsulated in an optically transparent matrix 13. The surface of the deposited layer 11 may be textured in a manner that promotes light extraction and effectively mixes the light components to create a homogeneous white light. The phosphor material 12 may be a combination of one or more phosphors of different compositions that emit light at different wavelengths in the visible region of the electromagnetic spectrum.

Figure 4:
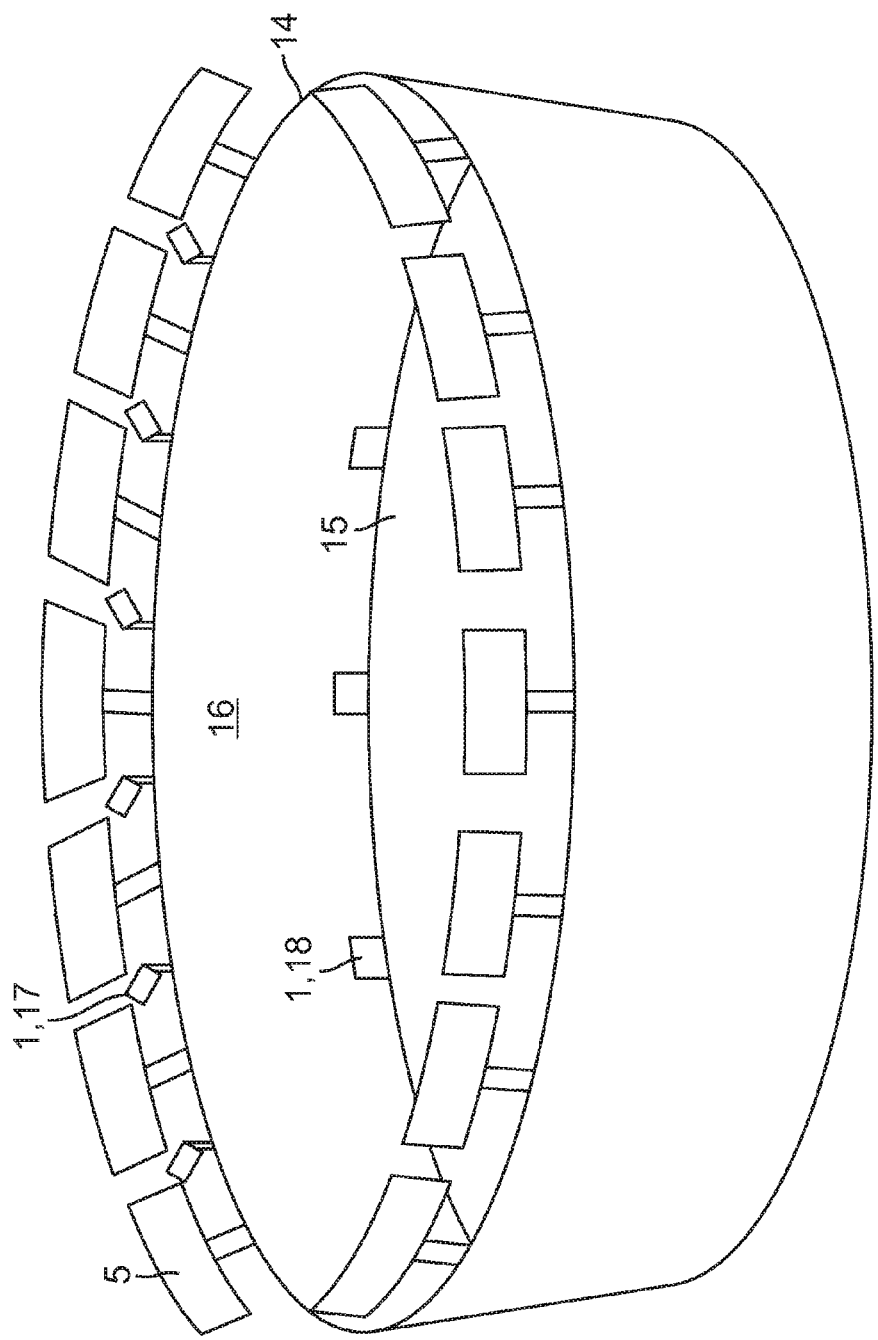
FIG. 4 is a schematic representing the lighting system in the context of a large venue, using a stadium as an example.

FIG. 4 is a schematic representing the lighting system in the context of a large venue, for example, a stadium 14. The area to be lighted is described by 15 and the area where spectators reside is described by 16. The laser diode emission must not travel through the area where spectators reside 16 due to eye safety concerns. The structures for housing the phosphor material 5 may be placed above the stadium 14, with the angle of reflected light being down towards the area to be lighted 15. The laser diodes 1 may be placed at a height above the area where spectators reside 17 or at ground level 18. Both locations 17 and 18 would still be located in an area that is easily accessible for laser diode 1 maintenance. If the laser diode 1 is placed at ground level 18, waveguiding material (not shown) must be used to carry the laser diode excitation to a location above the area where the spectators would reside 17.

Figure 5A:
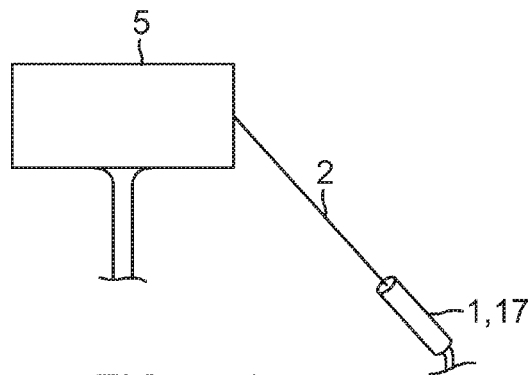
FIGS. 5(a), 5(b), 5(c) and 5(d) are schematics representing the methods for transferring the laser diode excitation to the phosphor material.
Figure 5B:
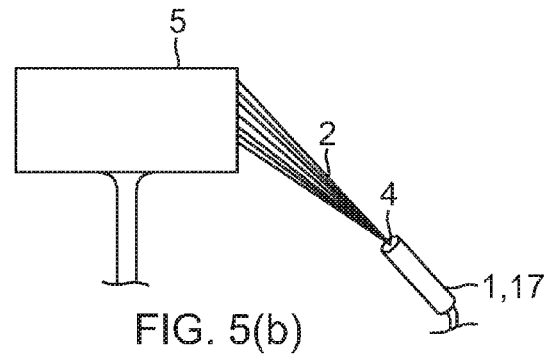
Figure 5C:
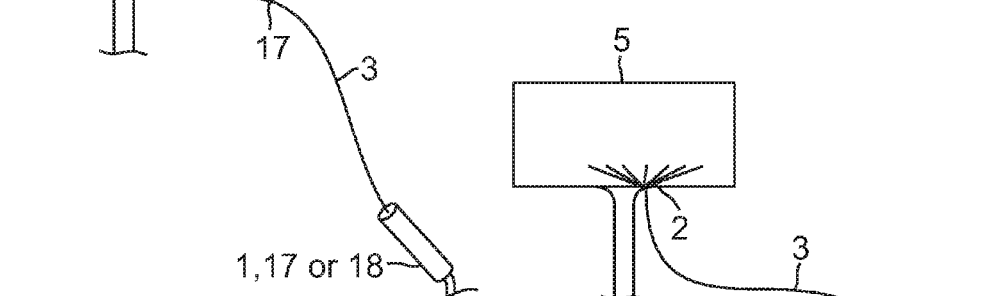
Figure 5D:
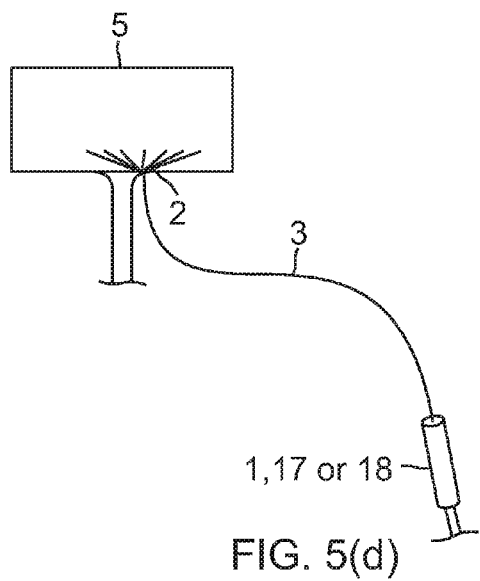

FIGS. 5(a), 5(b), 5(c) and 5(d) are schematic representations illustrating the methods for transferring the laser beam 2 from the laser diode casing 1 to the structure 5 housing the phosphor material. FIG. 5(a) shows the laser diode casing 1 placed at a height above the area where spectators reside 17 with the laser beam 2 directed into the structure 5 housing the phosphor material, while FIG. 5(b) shows the same configuration, but with the laser beam 2 passing through a diffuser 4 before reaching the structure 5. FIG. 5(c) and FIG. 5(d) show the laser diode casing 1, which may be placed either at a height above the area where spectators would reside 17 or at ground level 18, with the laser beam 2 carried through a waveguiding material 3 and then directed into the structure 5 housing the phosphor material. The waveguiding material 3 may transport the laser beam 2 either to a height above the area where spectators reside 17, as shown in FIG. 5(c), or to the structure 5, as shown in FIG. 5(d).

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A device for illuminating a venue, the device comprising:
   a laser diode for emitting a first light that is placed at ground level of a venue;
   one or more phosphor materials, optically coupled to the laser diode, for emitting a second light when excited by the first light; and
   a structure, having an optically transparent window, for housing the phosphor materials, wherein:
   the structure completely encloses the phosphor materials to protect them from harsh conditions;
   the structure comprises a substrate upon which the phosphor materials are deposited, and the substrate is made of a thermally conductive material to transport heat generated away from the phosphor materials;
   the first light emitted from the laser diode enters the structure to interact with the phosphor materials and the second light emitted from the phosphor materials exits the structure through the optically transparent window; and
   the structure is placed at a remote distance from the laser diode at a point of illumination above the ground level of the venue with the second light emitted from the phosphor materials being directed towards an area to be lighted.

2. The device of claim 1, wherein the first light emitted by the laser diode is transferred to the point of illumination via direct emission.

3. The device of claim 1, wherein the structure has a square, rectangular, circular or oval shape.

4. The device of claim 1, wherein the structure is connected to a post with or without a hinge that allows for tilting.

5. The device of claim 1, wherein the structure has an outer covering that directs the second light emitted from the phosphor materials in a specific direction.

6. The device of claim 1, wherein the optically transparent window further comprises a long-pass filter that filters out laser light.

7. The device of claim 1, wherein the substrate has a reflective surface to reflect the second light emitted from the phosphor materials onto the area to be lighted.

8. The device of claim 1, wherein the phosphor materials are deposited on the substrate using an optically transparent matrix.

9. The device of claim 1, wherein the phosphor materials are a combination of one or more phosphors of different compositions that emit light at different wavelengths.

10. The device of claim 1, wherein a layer containing the phosphor materials is deposited on a surface of the substrate and a surface of the layer is textured to promote light extraction and to mix light components to create a homogeneous white light.

* * * * *